(12) United States Patent
Kim et al.

(10) Patent No.: US 10,137,672 B2
(45) Date of Patent: Nov. 27, 2018

(54) LAMINATION DEVICE AND METHOD

(71) Applicant: SAMSUNG DISPLAY CO., LTD., Yongin, Gyeonggi-Do (KR)

(72) Inventors: Jae-Young Kim, Yongin (KR); Yang-Han Son, Yongin (KR); Myung-Gil Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/448,378

(22) Filed: Mar. 2, 2017

(65) Prior Publication Data

US 2017/0173932 A1 Jun. 22, 2017

Related U.S. Application Data

(62) Division of application No. 14/505,433, filed on Oct. 2, 2014, now Pat. No. 9,616,644.

(30) Foreign Application Priority Data

Mar. 17, 2014 (KR) ........................ 10-2014-0031166

(51) Int. Cl.
*B32B 37/00* (2006.01)
*B32B 38/18* (2006.01)
*B29C 65/00* (2006.01)
*B32B 37/10* (2006.01)
*B32B 37/12* (2006.01)

(52) U.S. Cl.
CPC ........ *B32B 37/0053* (2013.01); *B32B 37/003* (2013.01); *B32B 37/10* (2013.01); *B32B 37/12* (2013.01); *B32B 38/1866* (2013.01); *B29C 66/8362* (2013.01); *B32B 2457/20* (2013.01); *B32B 2457/208* (2013.01); *Y10T 156/10* (2015.01); *Y10T 156/1028* (2015.01)

(58) Field of Classification Search
CPC ............ B32B 37/0053; B32B 38/1866; B32B 2457/20–2457/208; B29C 66/8362
USPC ................................................. 156/475, 486
See application file for complete search history.

(56) References Cited

U.S. PATENT DOCUMENTS

| | | | |
|---|---|---|---|
| 5,534,096 | A | 7/1996 | Saito et al. |
| 5,720,847 | A | 2/1998 | Nagate et al. |
| 2004/0016506 | A1 | 1/2004 | Sakayori et al. |
| 2011/0120619 | A1 | 5/2011 | Harada et al. |
| 2013/0000822 | A1 | 1/2013 | Kim et al. |

(Continued)

FOREIGN PATENT DOCUMENTS

| | | |
|---|---|---|
| KR | 1997-0010112 A | 3/1997 |
| KR | 10-1214537 B1 | 12/2012 |

(Continued)

*Primary Examiner* — Carson Gross
(74) *Attorney, Agent, or Firm* — Lewis Roca Rothgerber Christie LLP

(57) ABSTRACT

A lamination device includes a jig configured to accommodate a window having a curved surface; a transfer member configured to allow a film member attached to the window to be spaced from the window; a roller unit configured to press a surface of the transfer member to which the film member is not attached and attaching the film member to the window; a driving unit connected to the roller unit and configured to move the roller unit along the curved surface of the window by rotating with respect to a single rotational center; and a pressing unit connected to the driving unit and the roller unit and configured to press the roller unit.

10 Claims, 6 Drawing Sheets

(56) References Cited

U.S. PATENT DOCUMENTS

2013/0284351 A1 10/2013 Natarajan et al.
2014/0377508 A1 12/2014 Oh et al.

FOREIGN PATENT DOCUMENTS

| KR | 10-2013-0007068 A | 1/2013 |
| KR | 10-1260297 B1 | 5/2013 |
| WO | WO 2010/018628 A1 | 2/2010 |

LAMINATION DEVICE AND METHOD

CROSS-REFERENCE TO RELATED APPLICATION

This application is a divisional of U.S. patent application Ser. No. 14/505,433, filed Oct. 2, 2014, which claims priority to and the benefit of Korean Patent Application No. 10-2014-0031166, filed on Mar. 17, 2014, in the Korean Intellectual Property Office, the entire disclosure of both of which are incorporated herein by reference.

BACKGROUND

1. Field

One or more embodiments of the present invention relate to a lamination device and method.

2. Description of the Related Art

Mobile-based electronic devices are widely used. Among mobile electronic devices, tablet personal computers (PCs) have become popular in recent years, in addition to small electronic devices such as mobile phones.

Such mobile electronic devices include display devices for providing visual information, such as images or videos, to users to support various functions thereof. Recently, since components for driving display devices have become smaller, display devices are of increasing importance in electronic devices. Display devices are developed to have a structure in which a display device in a flat state is bendable to form an angle.

The above display device may have various structures. The display device may include a window that protects an interior thereof from an external shock and various film members attached to the window. In this regard, there are many cases in which the display device has various shapes as described above, and thus film members are precisely attached to the window. In particular, various types of devices exist, and extensive research has been conducted regarding precisely attaching film members to the window.

SUMMARY

One or more embodiments of the present invention include a lamination device and method.

Additional aspects will be set forth in part in the description which follows and, in part, will be apparent from the description of the presented embodiments.

According to one or more embodiments of the present invention, a lamination device includes: a jig configured to accommodate a window having a curved surface; a transfer member configured to allow a film member attached to the window to be spaced from the window; a roller unit configured to press a surface of the transfer member to which the film member is not attached and attaching the film member to the window; a driving unit connected to the roller unit and configured to move the roller unit along the curved surface of the window by rotating with respect to a single rotational center; and a pressing unit connected to the driving unit and the roller unit and configured to press the roller unit.

The lamination device may further include: a first cushion unit mounted in a window accommodating portion of the jig.

The lamination device may further include: a tension maintaining roller for maintaining a uniform tension of the transfer member.

The roller unit may include: a core unit; and a second cushion unit surrounding the core unit.

The driving unit may include: a motor unit located above the window or below the jig, the motor unit being the rotational center of the roller unit, and being rotatably drivable; and a first connection frame accommodating the pressing unit and connecting the motor unit and the roller unit the first connection frame configured to rotate when driving the motor unit.

When the motor unit is located below the jig, the jig may being in the first connection frame.

The driving unit may include: a motor unit located above the window or below the jig, being the single rotational center, and being rotatably driable; a first connection frame accommodating the jig and the motor unit and the pressing unit; and a second connection frame accommodating the pressing unit connecting the first connection frame and the roller unit.

The pressing unit may be configured to press the roller unit at a uniform pressure on the transfer member.

The film member may be attached to a curved surface of the window.

The film member may include at least one of a touch screen, a display panel, a black matrix film, and a release paper.

According to one or more embodiments of the present invention, a lamination method includes: accommodating a window having a curved surface; placing a film member attached to a transfer member on the window; rotating and moving a roller unit with respect to a fixed rotational center, pressing the transfer member, to attach the film member to the window; and separating the window to which the film member is attached from the jig.

A first cushion unit may be mounted in the jig.

The film member may be positioned on the window by transferring the transfer member.

The transfer member may contact at least a part of a tension maintaining roller that maintains a uniform tension of the transfer member.

The lamination may further include: aligning the window and the film member after placing the film member The roller unit may include: a core unit; and a second cushion unit surrounding the core unit.

The roller unit may be connected to the driving unit having a fixed rotational center and rotates, and wherein the driving unit includes: a motor unit located above the window or below the jig, the motor unit being the rotational center of the roller unit, and being rotatably drivable; and a first connection frame accommodating the pressing unit and connecting the motor unit and the roller unit the first connection frame configured to rotate when driving the motor unit.

The roller unit may be connected to the driving unit having a fixed rotational center and rotates, and wherein the driving unit includes: a motor unit located above the window or below the jig, being the single rotational center, and being rotatably drivable; and a first connection frame accommodating the jig and connecting the motor unit and a pressing unit; and a second connection frame accommodating the pressing unit and connecting the first connection frame and the roller unit.

The film member may be attached to a curved surface of the window.

The film member may include at least one of a touch screen, a display panel, a black matrix film, and a release paper.

These general and specific embodiments may be implemented by using a system, a method, a computer program, or a combination thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
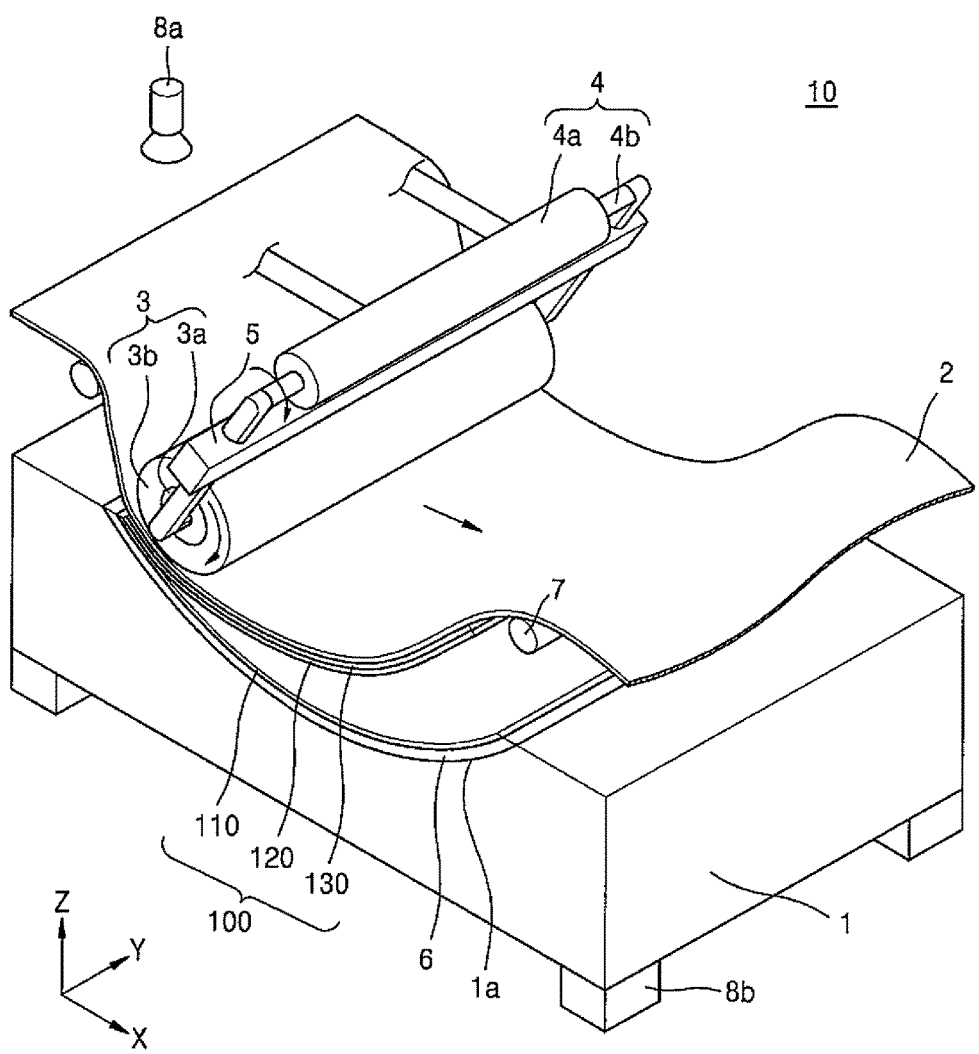
FIG. 1 is a conceptual diagram of a lamination device according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first," "second," etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Figure 2:
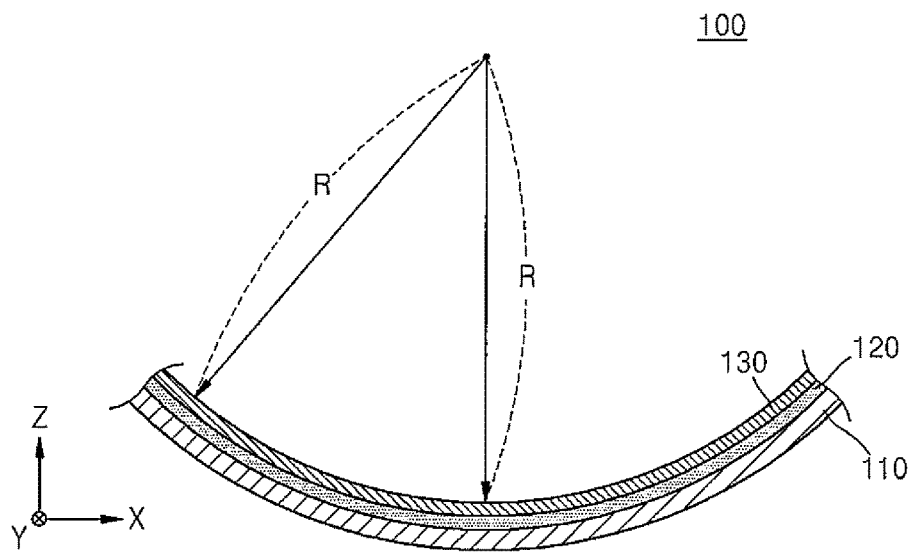
FIG. 2 is a cross-sectional view of a display device manufactured with the lamination device of FIG. 1.
Figure 3:
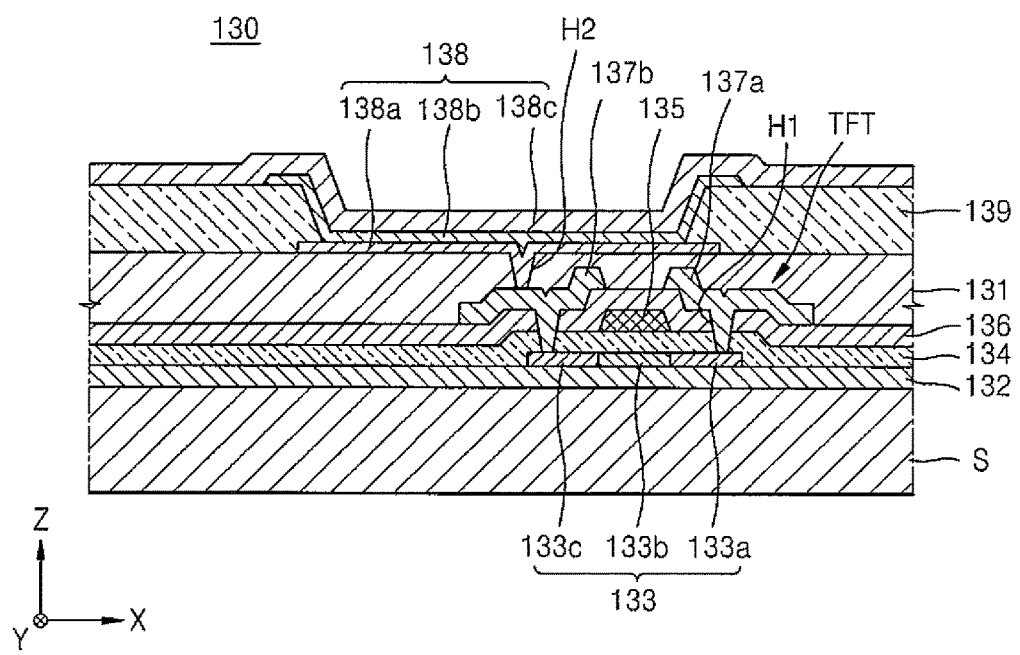
FIG. 3 is a cross-sectional view of a display panel of FIG. 2.

FIG. 1 is a conceptual diagram of a lamination device 10 according to an embodiment of the present invention. FIG. 2 is a cross-sectional view of a display device 100 manufactured with the lamination device 10 of FIG. 1. FIG. 3 is a cross-sectional view of a display panel 130 of FIG. 2.

Referring to FIGS. 1 through 3, the lamination device 10 may be used when the display device 100 is manufactured. In this regard, the display apparatus 100 may include a window 110 and a film member.

The window 110 may be formed to include a curved surface having a plurality of curvature radii. For example, the window 110 may be formed to have a first curved surface having a first curvature radius R1 in a lengthwise direction or in a width direction, a second curved surface having a second curvature radius R2, and a third curvature radius R3 having a third curvature radius R3. In this regard, the window 110 may further include a curved surface having curvature radii R4, R5, . . . Rn (wherein n is a natural number), in addition to the curved surface having the curvature radii R1 through R3.

In one embodiment, the window 110 may be formed to include a curved surface having a uniform curvature radius. For example, the window 110 may be formed to include a curved surface having a uniform curvature radius R. Hereinafter, for convenience of description, the window 110 may be formed to include the curved surface having the uniform curvature radius R.

The film member may be formed in various ways. For example, the film member may include at least one of a touch screen panel, a display panel 130, a black matrix film, and a release paper.

In this regard, the touch screen panel is the same as or similar to a conventional touch screen panel, and thus a detailed description thereof is not repeated. The display panel 130 may include a flexible organic light emitting display panel, a liquid crystal display panel, etc. The black matrix film may be a film in which a black matrix is printed on an adhesive film. The release paper may be a film that is attached to the window 110 and protects the window 110. In this regard, the film member may be flexibly formed. Hereinafter, for convenience of description, the film member is the display panel 130 that is an organic light emitting display panel.

The film member may be attached to a convex surface of the window 110 or a concave surface thereof. Hereinafter, for convenience of description, the film member is attached to the concave surface of the window 110.

The display panel 130 may include a first substrate S and an emission portion. In particular, the display panel 130 may include a thin film encapsulation layer B formed on the emission portion. In this regard, the thin film encapsulation layer B may be formed in a thin film encapsulation fashion. In addition to the case where the thin film encapsulation layer B is formed in the thin film encapsulation fashion, the display panel 130 may include a second substrate. However, hereinafter, for convenience of description, the thin film encapsulation layer B is formed in the thin film encapsulation fashion.

The emission portion may be formed on the first substrate S. In this regard, the emission portion may include a thin film transistor TFT. A passivation film 131 may be formed to cover the emission portion and the thin film transistor TFT. An organic light emitting device 138 may be formed on the passivation film 131.

In this regard, the first substrate S may be formed of a glass material but is not necessarily limited thereto. Alternatively, the first substrate S may be formed of a plastic material or a metal material such as stainless steel (SUS) or titanium (Ti). In one embodiment, the first substrate S may be formed of polyimide (PI). Hereinafter, for convenience of description, the first substrate S is formed of PI.

A buffer layer 132 formed of an organic compound and/or inorganic compound may be further provided on a top surface of the first substrate S. The organic compound and/or inorganic compound may include $SiO_x(x≥1)$ and $SiN_x(x≥1)$.

An active layer 133 arranged in a pattern may be provided on the buffer layer 132, and then may be buried by a gate insulation layer 134. The active layer 133 may include a source region 133a, a drain region 133c, and a channel region 133b between the source region 133a and the drain region 133c.

The active layer 133 may be formed to include a variety of materials. For example, the active layer 133 may include an inorganic semiconductor material such as amorphous silicon or crystalline silicon. In another example, the active layer 133 may include an oxide semiconductor material or an organic semiconductor material. However, hereinafter, for convenience of description, the active layer 133 is formed of amorphous silicon.

The active layer 133 may be formed by forming an amorphous silicon layer on the buffer layer 132, crystallizing the amorphous silicon layer to form a polycrystal silicon layer, and patterning the polycrystal silicon layer. The source and drain regions 133a and 133c of the active layer 133 may be doped with impurities according to a type of a TFT, such as a driving TFT and a switching TFT.

A gate electrode 135 corresponding to the active layer 133 and an interlayer dielectric 136 burying the gate electrode 135 may be provided on a top surface of the gate insulation layer 134.

A contact hole may be formed in the interlayer dielectric 136 and the gate insulation layer 134 so that a source electrode 137a and a drain electrode 137b are formed on the interlayer dielectric 136 to contact the source region 133a and the drain region 133c, respectively.

The passivation layer 131 may be formed on the above-formed thin film transistor TFT. A pixel electrode 138a of the organic light-emitting device (OLED) may be formed on the passivation layer 131. The pixel electrode 138a may contact the drain electrode 137b of the thin film transistor TFT by a via hole H2 formed in the passivation layer 131. The passivation layer 131 may be formed of an organic substance and/or inorganic substance with a single layer or multilayer structure. A top surface of the passivation layer 131 may be formed as a planarization layer regardless of a curve of a lower layer. On the other hand, the passivation layer 131 may be curved according to the curve of the lower layer. The passivation layer 131 may be formed of a transparent insulation material to achieve a resonance effect.

After the pixel electrode 138a is formed on the passivation layer 131, a pixel defining layer 139 is formed by using an organic substance and/or inorganic substance to cover the pixel electrode 138a and the passivation layer 131, and is opened to expose the pixel electrode 138a.

An intermediate layer 138b and an opposite electrode 138c are formed on at least the pixel electrode 138a.

The pixel electrode 138a may function as an anode electrode, and the opposite electrode 138c may function as a cathode electrode. Polarities of the pixel electrode 138a and the opposite electrode 138c may be switched.

The pixel electrode 138a and the opposite electrode 138c are insulated from each other by the intermediate layer 138b so that light is emitted from an organic emission layer by applying voltages of opposite polarities to intermediate layer 138b.

The intermediate layer 138b may include the organic emission layer. In another example, the intermediate layer 138b includes an organic emission layer and may further include at least one of a hole injection layer (HIL), a hole transport layer (HTL), an electron transport layer (ETL), and an electron injection layer (EIL). However, the present embodiment is not limited thereto, and the intermediate layer 138b may include the organic emission layer and may further include other various functional layers.

A unit pixel includes a plurality of sub-pixels that may emit lights of various colors. For example, the sub-pixels may include sub-pixels that emit lights of red, green, and blue or sub-pixels that emit lights of red, green, blue, and white.

The sub-pixels may include the intermediate layers 138b having organic emission layers that emit lights of various colors. For example, the sub-pixels include the intermediate layers 138b having organic emission layers that emit lights of red, green, and blue.

In another example, the sub-pixels that emit light of various colors may include the intermediate layers 138b that emit lights of the same color, for example, white, and may include a color converting layer or a color filter that coverts the white light into a light of a predetermined color.

The intermediate layer 138b emitting the white light may have a variety of structures, for example, a structure in which at least a light-emitting substance emitting a red light, a light-emitting substance emitting a green light, and a light-emitting substance emitting a blue light are stacked on one another. In another example of a structure for emitting the white light, the intermediate layer 138b may include a structure in which at least a light-emitting substance emitting a red light, a light-emitting substance emitting a green light, and a light-emitting substance emitting a blue light are mixed.

The red, greed, and blue colors are exemplary and the present embodiment is not limited thereto. In other words, any combination of other various colors, which is capable of emitting a white light, may be employed in addition to a combination of red, green, and blue colors.

The thin film encapsulation layer B may include a plurality of inorganic layers, or an inorganic layer and an organic layer.

The organic layer of the thin film encapsulation layer B is formed of a polymer and may be a single layer or a layer stack formed of any one of polyethylene terephthalate, polyimide, polycarbonate, epoxy, polyethylene, and polyacrylate. The organic layer may be formed of polyacrylate, and in detail, may include a polymerized monomer composition including diacrylate-based monomer and triacrylate-based monomer. The monomer composition may further include monoacrylate-based monomer. Also, the monomer composition may further include a well-known photoinitiator such as trimethyl benzoyl diphenyl phosphine oxide (TPO), but embodiments of the present invention are not limited thereto.

The inorganic layer of the thin film encapsulation layer B may be a single layer or a layer stack including a metal oxide or a metal nitride. In detail, the inorganic layer may include any one of SiNx, $Al_2O_3$, $SiO_2$, and $TiO_2$.

The top layer of the thin film encapsulation layer B that is exposed to the outside may be formed of an inorganic layer in order to prevent intrusion of moisture into the organic light-emitting device.

The thin film encapsulation layer B may include at least one sandwich structure in which at least one organic layer is inserted between at least two inorganic layers. In another example, the thin film encapsulation layer B may include at least one sandwich structure in which at least one inorganic layer is inserted between at least two organic layers. In another example, the thin film encapsulation layer B may include a sandwich structure in which at least one organic layer is inserted between at least two inorganic layers and a sandwich structure in which at least one inorganic layer is inserted between at least two organic layers.

The thin film encapsulation layer B may include a first inorganic layer, a first organic layer, and a second inorganic layer sequentially formed from the top portion of the OLED.

In another example, the thin film encapsulation layer B may include a first inorganic layer, a first organic layer, a second inorganic layer, a second organic layer, and a third inorganic layer sequentially formed from the top portion of the OLED.

In another example, the thin film encapsulation layer B may include a first inorganic layer, a first organic layer, a second inorganic layer, a second organic layer, a third inorganic layer, a third organic layer, and a fourth inorganic layer sequentially formed from the top portion of the OLED.

A halogenized metal layer including lithium fluoride (LiF) may be additionally included between the OLED and the first inorganic layer. The halogenized metal layer may prevent the OLED from being damaged when the first inorganic layer is formed in a sputtering method or a plasma deposition method.

The first organic layer may be smaller than the second inorganic layer, and the second organic layer may be smaller than the third inorganic layer.

In another example, the first organic layer may be completely covered by the second inorganic layer, and the second organic layer may be completely covered by the third inorganic layer.

The lamination device 10 that attaches the window 110 and the display panel 130 to each other may include a jig 1, a transfer member 2, a roller unit 3, a driving unit 4, a pressing unit 5, a first cushion unit 6, and a tension maintaining roller 7.

The window 110 including the curved surface may be seated in the jig 1. In this regard, a seating groove 1a or a seating protrusion may be formed in accordance with a shape of the window 110. For example, when a convex portion of the window 110 is seated in the jig 1, the seating groove 1a may be formed in the jig 1. When a concave portion of the window 110 is seated in the jig 1, a seating protrusion may be formed in the jig 1. In one embodiment, the seating groove 1a is formed in accordance with the shape of the window 110.

The seating groove 1a may be formed to have the same curvature radius as the window 110. In this regard, the first cushion unit 6 may be mounted in the seating groove 1a to support the window 110. The first cushion unit 6 may be formed of an elastic material, such as rubber, silicon, urethane, etc.

The transfer member 2 may attach to the above-described display panel 130. In this regard, the transfer member 2 may have a little adhesive force to attach to the display panel 130. In particular, the transfer member 2 may include an adhesive material, such as an optically clear adhesive (OCA) film.

The transfer member 2 may be supplied from the outside. In this regard, the display panel 130 may be attached to the transfer member 2. The at least one tension maintaining roller 7 may be mounted in the transfer member 2 to support the transfer member 2. In this regard, the tension maintaining roller 7 may support the transfer member 2 to allow the transfer member 2 to maintain a predetermined tension when transferring the transfer member 2. In particular, the tension maintaining roller 7 may maintain a uniform tension of the transfer member 2 when the roller unit 3 presses the transfer member 2.

The roller unit 3 may include a core unit 3a and a second cushion unit 3b mounted to surround an exterior surface of the core unit 3a. In this regard, the core unit 3a may be formed of a metallic material. The second cushion unit 3b may be formed in the same or similar manner as the first cushion unit 6.

The core unit 3a and the second cushion unit 3b may be formed in a cylindrical shape. In this regard, the core unit 3a and the second cushion unit 3b may be formed to be greater than a width of the window 110 or a length thereof. In particular, the core unit 3a and the second cushion unit 3b may be oriented in a width direction of the window 110 or in a lengthwise direction thereof to press the film member.

The driving unit 4 may be provided in an upper space of the window 110, and may include a motor unit 4a that is a rotational center of the roller unit 3 and is rotatably drivable. The driving unit 4 may connect the motor unit 4a and the roller unit 3, and may include a first connection frame 4b in which the pressing unit 5 is mounted.

In this regard, the pressing unit 5 may be formed as a pneumatic or hydraulic cylinder. In particular, the pressing unit 5 may be connected to an external supply unit to supply air, gas, or fluid. Alternatively, the pressing unit 5 may be formed as a compression spring to press the roller unit 3 when operating the roller unit 3.

The lamination device 10 may further include an align unit that aligns positions of the film member and the window 110 in addition to the above-described constitutional elements. In this regard, the align unit may include a camera unit 8a that captures images of the positions of the film member and the window 110 and a position alignment unit 8b that aligns the positions of the film member and the window 110 based on the images captured by the camera unit 8a. The alignment unit 8b may adjust a position of the transfer member 2 or a position of the jig 1.

A lamination method by using the lamination device 10 may allow the window 110 to be seated in the seating groove 1a of the jig 1. In this regard, the convex portion of the window 110 may contact the first cushion unit 6 mounted in the seating groove 1a, and the concave portion thereof may be exposed to the outside.

If the window 110 is disposed, the display panel 130 may be provided on the window 110 by transferring the transfer member 2. In this regard, a transfer unit that transfers the transfer member 2 may be separately provided outside.

If the display panel 130 is provided on the window 110 by transferring the transfer member 2, the camera unit 8a may capture an image of the window 110 and compare the image with a preset image. In this regard, the position alignment unit 8b may adjust a position of the window 110 to a preset position by moving the jig 1. In particular, the position alignment unit 8b may be controlled by a control unit.

If the above process is complete, the camera unit 8a may capture an image of the display panel 130 again and compare the image with the preset image. In this regard, the control unit may be separately provided to compare the image captured by the camera unit 8a with the preset image and adjust a position of the display panel 130. In particular, the control unit may control the transfer unit and move the transfer member 2, thereby adjusting the position of the display panel 130.

If the positions of the window 110 and the display panel 130 are aligned, the roller unit 3 may rotate after contacting a surface of the transfer member 2. In more detail, when the motor unit 4a operates, the first connection frame 4b may rotate with respect to the rotational center of the motor unit 4a. In particular, the rotational center of the motor unit 4a may be formed in the same manner as a curvature center of the window 110. In this regard, when the roller unit 3 moves, the roller unit 3 may apply substantially constant force to the transfer member 2 in a perpendicular direction.

The roller unit 3 may apply force to the display panel 130 via the transfer member 2, thereby attaching the display panel 130 and the window 110 to each other. In this regard, the roller unit 3 may rotate a surface of the transfer member 2 and move. In this case, the adhesive film 120 may be disposed between the display panel 130 and the window 110 or an adhesive material may be coated on the display panel 130.

During the above process, the pressing unit 5 mounted in the first connection frame 4b may apply a force to the roller unit 3. In particular, when the pressing unit 5 is mounted in the center of the first connection frame 4b, the first connection frame 4b may separate the center of the first connection frame 4b, thereby supporting the pressing unit 5 and applying force of the pressing unit 5 to the roller unit 3 when the pressing unit 5 presses the roller unit 3.

When the pressing unit 5 presses the roller unit 3, the pressing unit 5 may press the transfer member 2 at a uniform pressure. For example, the roller unit 3 may move toward the concave surface of the window 110, and the pressing unit 5 may prevent the roller unit 3 from being separated from the transfer member 2. Furthermore, the pressing unit 5 may absorb shock or press the roller unit 3 according to motion of the roller unit 3. In this regard, the roller unit 3 may sequentially move from one end of the display panel 130 to another end thereof.

After attaching the window 110 to the display panel 130, the window 110 may be separated from the jig 1. In one embodiment, the window 110 may be separated from the jig 1 by using a separate structure such as a robot arm.

Therefore, the lamination device 10 and the lamination method may sequentially attach the window 110 and the display panel 130 to each other from one side to another side, thereby minimizing bubbles formed when attaching the window 110 to the display panel 130.

The lamination device 10 and the lamination method may also attach the window 110 and the display panel 130 to each other at a uniform pressure, thereby preventing the display panel 130 from being pushed or damaged.

Figure 4:
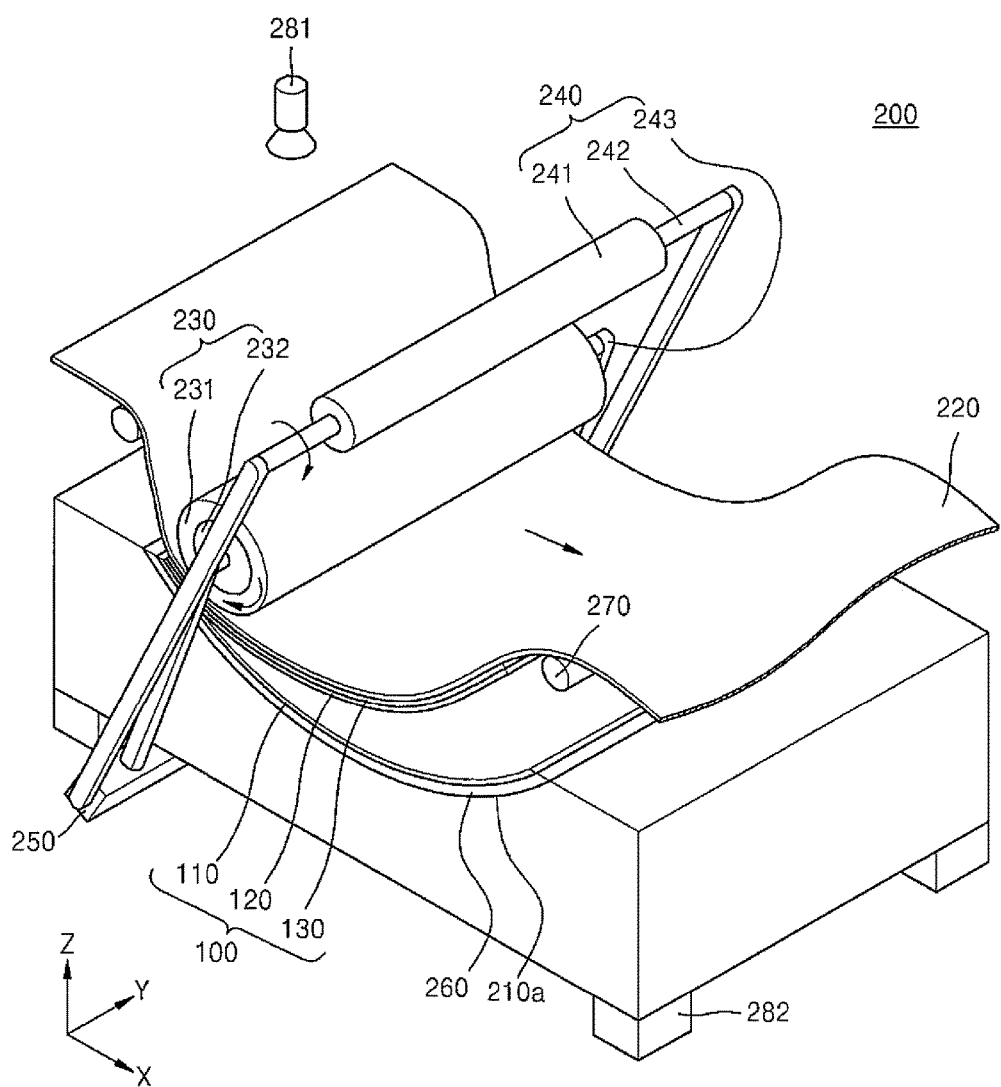
FIG. 4 is a conceptual diagram of a lamination device according to another embodiment of the present invention.

FIG. 4 is a conceptual diagram of a lamination device 200 according to another embodiment of the present invention.

Referring to FIG. 4, the lamination device 200 may include a jig 210, a transfer member 220, a roller unit 230, a driving unit 240, a pressing unit 250, a first cushion unit 260, and a tension maintaining roller 270. In this regard, the jig 210, the transfer member 220, the roller unit 230, the pressing unit 250, the first cushion unit 260, and the tension maintaining roller 270 are the same as or are similar to those described with reference to FIGS. 1 through 3 above, and thus detailed descriptions thereof are not repeated.

The driving unit 240 may be provided in an upper space of the jig 210, and may include a motor unit 241 that is a rotational center and is rotatably drivable. The driving unit 240 may connect the motor unit 241 and the pressing unit 250, and may include a first connection frame 242 in which the jig 210 is provided. The driving unit 240 may connect the first connection frame 242 and the roller unit 230, and may include a second connection frame 243 in which the pressing unit 250 is mounted.

A space is formed in the first connection frame 242 and the second connection frame 243 so that the jig 210 may be provided in the space. In more detail, one end of the first connection frame 242 may be connected to the motor unit 241 and rotate. The second connection frame 243 and the pressing unit 250 may be provided in the first connection frame 242.

The lamination device 200 may include an align unit, a control unit, and a transfer unit, in addition to the above-described constitutional elements. In this regard, the align unit, the control unit, and the transfer unit are the same as or are similar to those described above, and thus detailed descriptions thereof are not repeated.

The lamination device 200 may allow the window 110 and a film member to be adhered to each other. In this regard, the adhesive film 120 or an adhesive material may be disposed between the window 110 and the film member.

As described above, the film member may include at least one of a touch screen panel, the display panel 130, a black matrix film, and a release paper. However, hereinafter, for convenience of description, the film member is the display panel 130 as described above.

In regards to an operation of the above-formed lamination device 200, the window 110 may be seated in the jig 210. In this regard, the window 110 may be inserted into a seating groove 210a of the jig 210 and seated therein. In particular, the window 110 may be formed to include a curved surface having a uniform curvature radius as described above.

When the window 110 is seated, the transfer unit may operate to transfer the transfer member 220. In this regard, the display panel 130, along with the transfer member 220, may move so that the display panel 130 may be provided on the window 110.

If the above process is complete, the align unit may be used to align positions of the display panel 130 and the window 110. In this regard, a method of aligning the positions of the display panel 130 and the window 110 by using a camera unit 281 and a position alignment unit 282 is the same as or is similar to that described above, and thus a detailed description thereof is not repeated.

If the display panel 130 and the window 110 are completely aligned, the motor unit 241 may move and rotate the first connection frame 242. In this regard, the pressing unit 250 and the second connection frame 243 that are connected to the first connection frame 242 may move along with the first connection frame 242. The roller unit 230 may be connected to the second connection frame 243 and may move along with the second connection frame 243.

The roller unit 230 may be mounted in the second connection frame 243 to rotate by itself so that the roller unit 230 may rotate when the second connection frame 243 rotates. In more detail, a core unit 231 may be rotatably mounted in the second connection frame 243 so that the core unit 231 may rotate with respect to a center of the second connection frame 243 when the second connection frame 243 rotates. In this regard, a second cushion unit 232 may rotate along a surface of the transfer member 220.

When the roller unit 230 rotates, the roller unit 230 may move along the surface of the transfer member 220. In this regard, the roller unit 230 may apply force to the transfer member 220, and the display panel 130 attached to the transfer member 220 may be adhered to the window 110. The tension maintaining roller 270 may maintain a uniform tension of the transfer member 220 when the roller unit 230 applies force to the transfer member 220. In this case, an adhesive film or an adhesive material may be located between the display panel 130 and the transfer member 220.

During the process, the pressing unit 250 may press the roller unit 230. In this regard, the pressing unit 250 may apply force to the second connection frame 243, thereby pulling the roller unit 230 to the jig 210 at a uniform force. In particular, the roller unit 230 may apply a uniform pressure to the transfer member 220 by using the uniform force, and thus the display panel 130 and the window 110 may be adhered to each other at a uniform pressure. In this case, the roller unit 230 may apply force to the display panel 130 in a direction perpendicular to a tangential curved surface of the window 110.

If the above process is complete, the window 110 to which the display panel 130 is attached may be separated from the jig 210. As such, the roller unit 230 may not contact the transfer member 220, and may remain spaced apart from the transfer member 220. In this case, in particular, the motor unit 241 may operate such that the roller unit 230 may be positioned higher than the transfer member 220, and the roller unit 230 may be spaced from the transfer member 220 by controlling a pressure of the pressing unit 250.

Therefore, the lamination device 200 and the lamination method may sequentially attach the window 110 and the display panel 130 to each other from one side to another side, thereby minimizing bubbles formed when attaching the window 110 to the display panel 130.

The lamination device 200 and the lamination method may also attach the window 110 and the display panel 130 to each other at a uniform pressure, thereby preventing the display panel 130 from being pushed or damaged.

Figure 5:
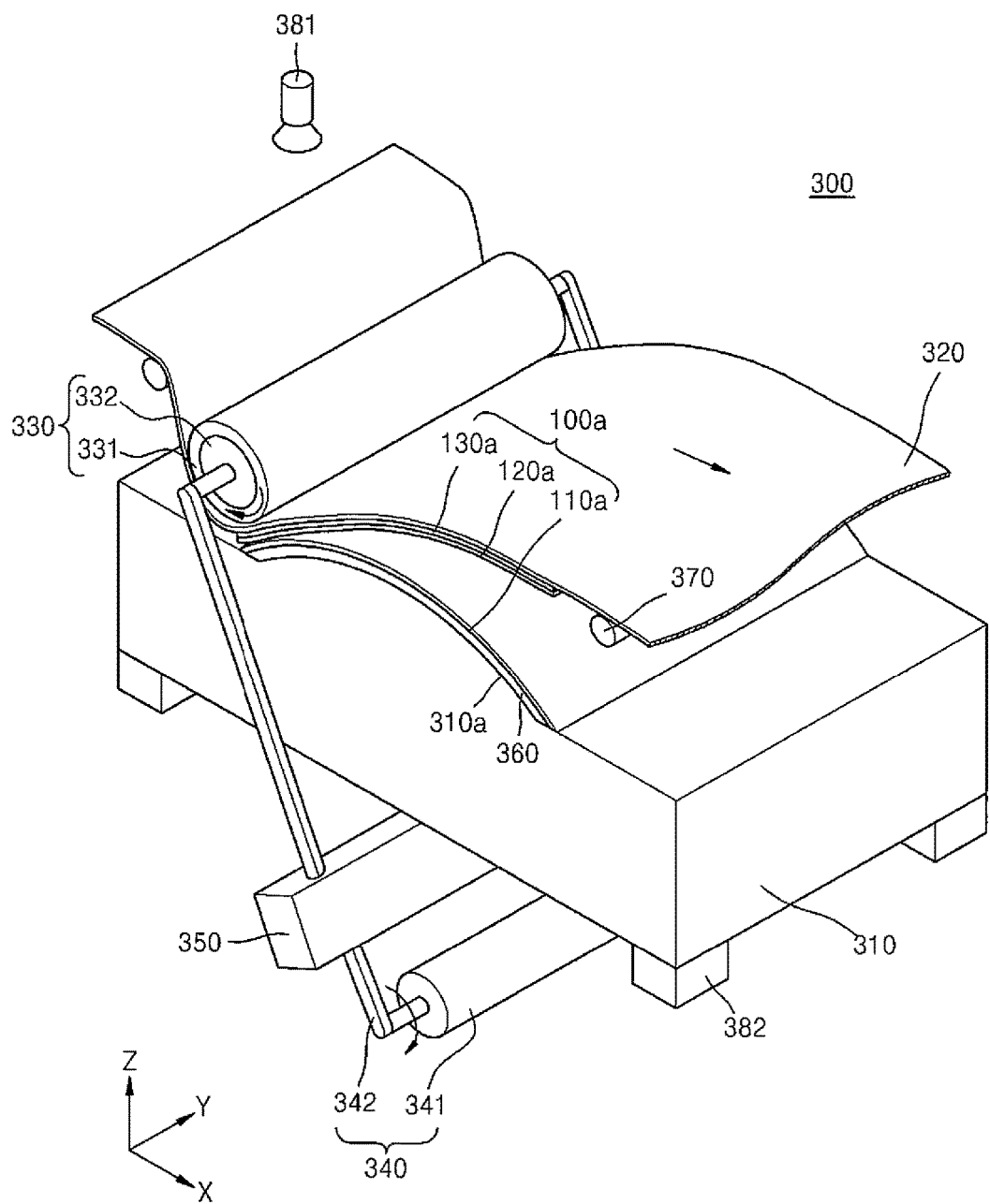
FIG. 5 is a conceptual diagram of a lamination device according to another embodiment of the present invention.
Figure 6:
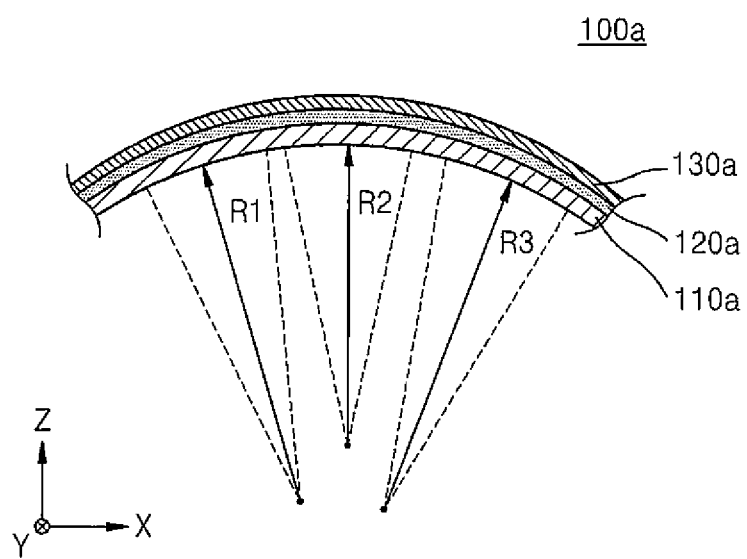
FIG. 6 is a cross-sectional view of a display device manufactured with the lamination device of FIG. 5.

FIG. 5 is a conceptual diagram of a lamination device 300 according to another embodiment of the present invention. FIG. 6 is a cross-sectional view of a display device 100a manufactured by the lamination device 300 of FIG. 5.

Referring to FIGS. 5 and 6, the lamination device 300 may include a jig 310, a transfer member 320, a roller unit 330, a driving unit 340, a pressing unit 350, a first cushion unit 360, and a tension maintaining roller 370. In this regard, the transfer member 320, the roller unit 330, the pressing unit 350, and the tension maintaining roller 370 are the same as or are similar to those described above, and thus detailed descriptions thereof are not repeated.

The jig 310 may include a seating protrusion 310a of which at least a part protrudes. The seating protrusion 310a may be formed in the same or similar manner as a concave portion of the window 110.

The first cushion unit 360 may be mounted in the seating protrusion 310a. The first cushion unit 360 may be the same as or similar to that described above, and a detailed description thereof is not repeated.

The driving unit 340 may be located beneath the jig 310, as shown in FIG. 5, and may include a motor unit 341 that is a rotational center and rotatably drives. The driving unit 340 may include a first connection frame 342 that connects the motor unit 341 and the roller unit 330, wherein, the pressing unit 350 may be mounted in the first connection frame 342.

A space is formed in the first connection frame 342 so that the jig 310 may be provided in the space. In more detail, one end of the first connection frame 342 may be connected to the motor unit 341 and rotate. The pressing unit 350 may be mounted in the first connection frame 342 as described above, and the roller unit 330 may be mounted in an edge thereof.

The lamination device 300 may include an align unit, a control unit, and a transfer unit, in addition to the above-described constitutional elements. In this regard, the align unit, the control unit, and the transfer unit are the same as or are similar to those described above, and thus detailed descriptions thereof are not repeated.

The lamination device 300 may manufacture the display device 100a by adhering a window 110a and a film member. In this regard, an adhesive film 120a or an adhesive material may be disposed between the window 110a and the film member.

The window 110a may be formed to include a curved surface having a uniform curvature radius. As another example, the window 110a may be formed to include a curved surface having a variable curvature radius. Hereinafter, for convenience of description, the window 110a is formed to include the curved surface having three variable curvature radii.

As described above, the film member may include at least one of a touch screen panel, a display panel 130a, a black matrix film, and a release paper. However, hereinafter, for convenience of description, the film member is the display panel 130a as described above.

The display panel 130a may be attached to a concave surface of the window 110a as described above. As another example, the display panel 130a may be attached to a convex surface of the window 110a. In this regard, hereinafter, for convenience of description, the display panel 130a may be attached to the convex surface of the window 110a.

In regards to an operation of the above-formed lamination device 300, the window 110a may be seated in the jig 310. In this regard, the window 110a may be seated in a seating groove 310a of the jig 310 so that the convex surface of the window 110a may face toward the transfer member 320.

If the window 110a is seated as described above, the transfer unit may operate to transfer the transfer member 320. In this regard, the display panel 130a, along with the transfer member 320, may move so that the display panel 130a may be provided on the window 110a.

If the above process is complete, positions of the display panel 130a and the window 110a may be aligned by using a camera unit 381 and a position alignment unit 382 of the align unit. In this regard, a method of aligning the positions of the display panel 130a and the window 110a is the same as or is similar to that described above, and thus a detailed description thereof is not repeated.

If the display panel 130a and the window 110a are completely aligned, the motor unit 341 may operate and rotate the first connection frame 342. In this regard, the pressing unit 350 and the roller unit 330 that are connected to the first connection frame 342 may move along with the first connection frame 342.

The roller unit 330 may be mounted in the first connection frame 342 to rotate by itself so that the roller unit 330 may rotate when the first connection frame 342 rotates. In more detail, a core unit 331 may be rotatably mounted in the first connection frame 342 so that the core unit 331 may rotate with respect to a center of the first connection frame 342 when the first connection frame 342 rotates. In this regard, a second cushion unit 332 may rotate along a surface of the transfer member 320.

When the roller unit 330 rotates as described above, the roller unit 330 may move along the surface of the transfer member 320. In this regard, the roller unit 330 may apply force to the transfer member 320, and the display panel 130a attached to the transfer member 320 may be adhered to the convex portion of the window 110a. The tension maintaining roller 370 may maintain a uniform tension of the transfer member 320 when the roller unit 330 applies force to the transfer member 320. In this case, an adhesive film or an adhesive material may be located between the display panel 130a and the transfer member 320.

During the process, the pressing unit 350 may press the roller unit 330. In this regard, the pressing unit 350 may pull the roller unit 330 to the jig 310 at a uniform force. In particular, the roller unit 330 may apply a uniform pressure to the transfer member 320 by using the uniform force, and thus the display panel 130a and the window 110a may be adhered to each other at a uniform pressure. In this regard, the curvature radii of the window 110a may be changed and thus, an inner pressure of the pressing unit 350 may vary.

When the above process is complete, the window 110a to which the display panel 130a is attached may be separated from the jig 310. In this regard, the roller unit 330 may not contact the transfer member 320, and may remain spaced apart from the transfer member 320. In this case, in particular, the motor unit 341 may operate such that the roller unit 330 may be positioned higher than the transfer member 320, and the roller unit 330 may be spaced from the transfer member 320 by controlling a pressure of the pressing unit 350.

Therefore, the lamination device 300 and the lamination method may sequentially attach the window 110a and the display panel 130a to each other from one side to another side, thereby minimizing bubbles formed when attaching the window 110a to the display panel 130a.

The lamination device 300 and the lamination method may also attach the window 110a and the display panel 130a to each other at a uniform pressure, thereby preventing the display panel 130a from being pushed or damaged.

Figure 7:
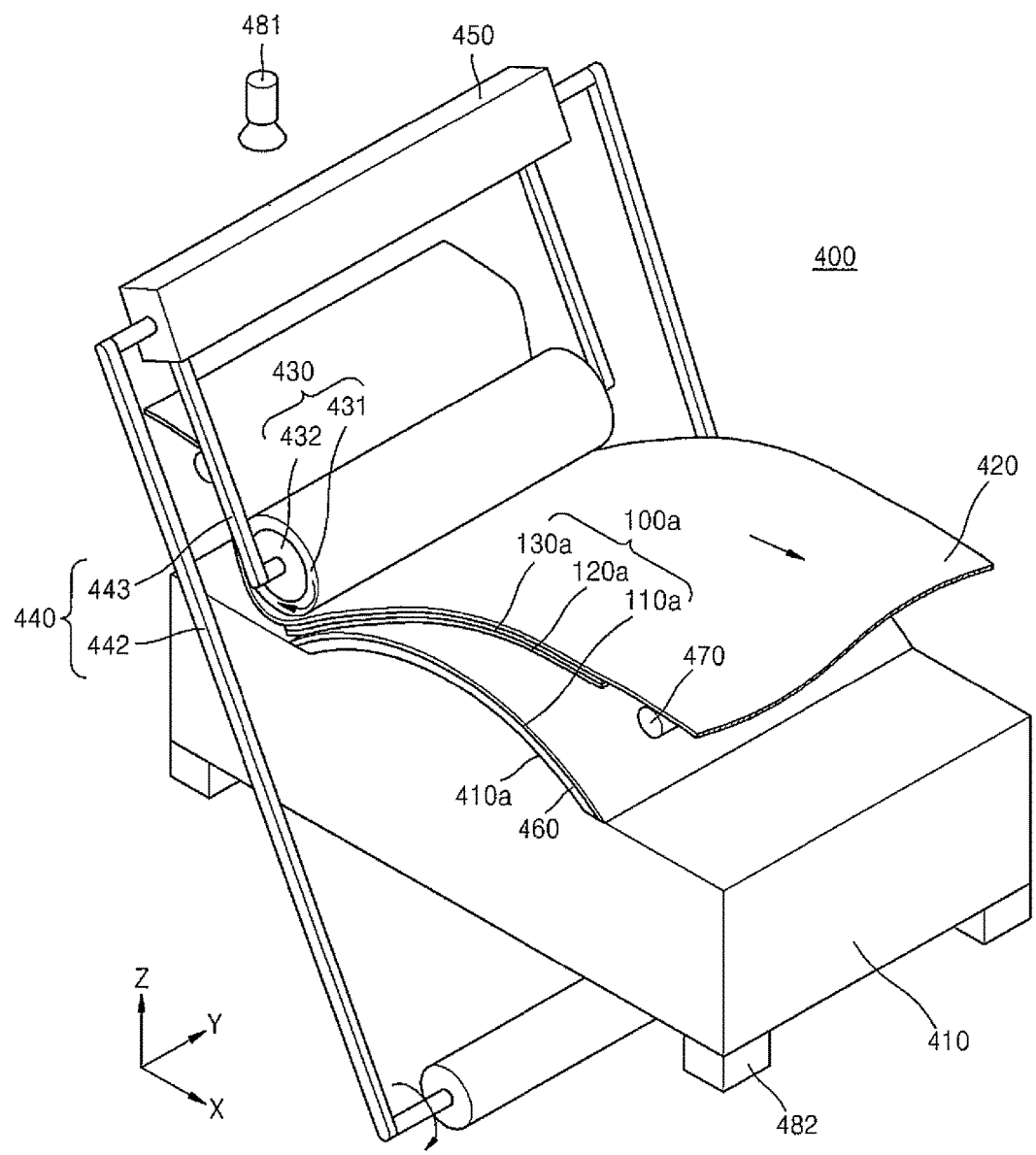
FIG. 7 is a conceptual diagram of a lamination device according to another embodiment of the present invention.

FIG. 7 is a conceptual diagram of a lamination device 400 according to another embodiment of the present invention.

Referring to FIG. 7, the lamination device 400 may include a jig 410, a transfer member 420, a roller unit 430, a driving unit 440, a pressing unit 450, a first cushion unit 460, and a tension maintaining roller 470. In this regard, the jig 410, the transfer member 420, the roller unit 430, the pressing unit 450, and the tension maintaining roller 470 are the same as or are similar to those described with reference to FIGS. 5 and 6 above, and thus detailed descriptions thereof are not repeated.

The driving unit 440 may be disposed in a lower space of the jig 410, and may include a motor unit 441 that is a rotational center and rotatably drives. The driving unit 440 may include a first connection frame 442 that connects the motor unit 441 and the pressing unit 450, and in which the jig 410 is disposed. The driving unit 440 may include a second connection frame 443 that connects the first connection frame 442 and the roller unit 430, and in which the pressing unit 450 is mounted.

A space is formed in the first connection frame 442 and the second connection frame 443 so that the jig 410 may be provided in the space. In more detail, one end of the first connection frame 442 may be connected to the motor unit 441 and rotate. The second connection frame 443 and the pressing unit 450 may be mounted in the first connection frame 442. In this regard, the pressing unit 450 may be positioned opposite to the motor unit 441 with respect to the jig 410.

The lamination device 400 may include an align unit, a control unit, and a transfer unit, in addition to the above-described constitutional elements. In this regard, the align unit, the control unit, and the transfer unit are the same as or are similar to those described above, and thus detailed descriptions thereof are not repeated.

The lamination device 400 may allow the window 110a and a film member to adhere to each other. In this regard, the adhesive film 120a or an adhesive material may be disposed between the window 110a and the film member.

The window 110a may be formed to include a curved surface having a uniform curvature radius or a curved surface having a variable curvature radius. Hereinafter, for convenience of description, the window 110a is formed to include the curved surface having three variable curvature radii.

As described above, the film member may include at least one of a touch screen panel, a display panel 130a, a black matrix film, and a release paper. However, hereinafter, for convenience of description, the film member is the display panel 130a as described above. Hereinafter, for convenience of description, the display panel 130a may be attached to a convex surface of the window 110a.

In regards to an operation of the above-formed lamination device 400, the window 110a may be seated in the jig 410. In this regard, the window 110a may be seated in a seating groove 410a of the jig 410. In particular, the window 110a may be formed to include a curved surface having a uniform curvature radius as described above.

If the window 110a is seated as described above, the transfer unit may operate to transfer the transfer member 420. In this regard, the display panel 130a, along with the transfer member 420, may move so that the display panel 130a may be provided on the window 110a.

If the above process is complete, positions of the display panel 130a and the window 110a may be aligned by using a camera unit 481 and a position alignment unit 482 of the align unit. In this regard, a, method of operating the align unit is the same as or is similar to that described above, and thus a detailed description thereof is not repeated.

If the display panel 130a and the window 110a are completely aligned, the motor unit 441 may operate and rotate the first connection frame 442. In this regard, the pressing unit 450 and the second connection frame 443 that are connected to the first connection frame 442 may move along with the first connection frame 442. The roller unit 430 may be connected to the second connection frame 443 and may rotate along with the second connection frame 443.

The roller unit 430 may be mounted in the second connection frame 443 to rotate by itself so that the roller unit 430 may rotate when the second connection frame 443 rotates. In more detail, a core unit 431 may be rotatably mounted in the second connection frame 443 so that the core unit 431 may rotate with respect to a center of the second connection frame 443 when the second connection frame 443 rotates. In this regard, a second cushion unit 432 may rotate along a surface of the transfer member 420.

When the roller unit 430 rotates as described above, the roller unit 430 may move along the surface of the transfer member 420. In this regard, the roller unit 430 may apply force to the transfer member 420, and the display panel 130a attached to the transfer member 420 may be adhered to the convex portion of the window 110a. The tension maintaining roller 470 may maintain a uniform tension of the transfer member 420 when the roller unit 430 applies force to the transfer member 420. In this case, an adhesive film or an adhesive material may be disposed between the display panel 130a and the transfer member 420.

During the process, the pressing unit 450 may press the roller unit 430. In this regard, the pressing unit 450 may pull the roller unit 430 to the jig 410 at a uniform force. In particular, the roller unit 430 may apply a uniform pressure to the transfer member 420 by using the uniform force, and thus the display panel 130*a* and the window 110*a* may be adhered to each other at a uniform pressure. In this regard, an inner pressure of the pressing unit 450 may be controlled to vary.

If the above process is complete, the window 110*a* to which the display panel 130*a* is attached may be separated from the jig 410. In this regard, the roller unit 430 may not contact the transfer member 420, and may remain spaced from the transfer member 420. In this case, in particular, the motor unit 441 may operate such that the roller unit 430 may be positioned higher than the transfer member 420, and the roller unit 430 may be spaced from the transfer member 420 by controlling a pressure of the pressing unit 450.

Therefore, the lamination device 400 and the lamination method may sequentially attach the window 110*a* and the display panel 130*a* to each other from one side to another side, thereby minimizing bubbles formed when attaching the window 110*a* to the display panel 130*a*.

The lamination device 400 and the lamination method may also attach the window 110*a* and the display panel 130*a* to each other at a uniform pressure, thereby preventing the display panel 130*a* from being pushed or damaged.

As described above, according to the one or more of the above embodiments of the present invention, a lamination device and method may firmly attach a film member to a window having a curved surface.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A lamination device comprising:
    a jig configured to accommodate a window having a curved surface;
    a transfer member configured to allow a film to be attached to the window to be spaced from the jig;
    a roller unit configured to press a surface of the transfer member to which the film is not attached and attaching the film to the window;
    a driver connected to the roller unit and configured to move the roller unit along the curved surface of the window by rotating with respect to a fixed rotational center; and
    a pressing unit connected to the driver and the roller unit and configured to press the roller unit.

2. The lamination device of claim 1 further comprising a jig cushion mounted in a window accommodating portion of the jig.

3. The lamination device of claim 1 further comprising a tension maintaining roller for maintaining a uniform tension of the transfer member.

4. The foldable display apparatus of claim 2, wherein the first housing further comprises:
    a third hinge shaft away from the second housing; and
    a first housing cover that is pivotally connected to the third hinge shaft, and that is configured to move according to rotation of the first hinge cover.

5. The lamination device of claim 1, wherein the driver comprises:
    a motor located above the window or below the jig, the motor being a rotational center of the roller unit, and being rotatably drivable; and
    a first connection frame accommodating the pressing unit and connecting the motor and the roller unit, the first connection frame configured to rotate when driving the motor.

6. The lamination device of claim 5, wherein, when the motor is located below the jig, the jig being in the first connection frame.

7. The lamination device of claim 1, wherein the driver comprises:
    a motor located above the window or below the jig, being a single rotational center, and being rotatably drivable;
    a first connection frame accommodating the jig and connecting the motor and the pressing unit; and
    a second connection frame accommodating the pressing unit and connecting the first connection frame and the roller unit.

8. The lamination device of claim 1, wherein the pressing unit is configured to press the roller unit at a uniform pressure on the transfer member.

9. The lamination device of claim 1, wherein the film is configured to be attached to a curved surface of the window.

10. The lamination device of claim 1, wherein the film comprises at least one of a touch screen, a display panel, a black matrix film, and a release paper.

* * * * *